United States Patent
Jiang et al.

(10) Patent No.: US 11,777,966 B2
(45) Date of Patent: Oct. 3, 2023

(54) SYSTEMS AND METHODS FOR CAUSATION ANALYSIS OF NETWORK TRAFFIC ANOMALIES AND SECURITY THREATS

(71) Applicant: Cisco Technology, Inc., San Jose, CA (US)

(72) Inventors: Yu Jiang, Shanghai (CN); Saravanan Radhakrishnan, Bangalore (IN); Jeffrey Cai, Shanghai (CN); Yuefeng Jiang, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 393 days.

(21) Appl. No.: 16/693,884

(22) Filed: Nov. 25, 2019

(65) Prior Publication Data

US 2021/0160263 A1 May 27, 2021

(51) Int. Cl.
*H04L 9/40* (2022.01)
*H04L 43/087* (2022.01)
*H04L 43/16* (2022.01)
*H04L 43/0829* (2022.01)

(52) U.S. Cl.
CPC ........ *H04L 63/1425* (2013.01); *H04L 43/087* (2013.01); *H04L 43/0829* (2013.01); *H04L 43/16* (2013.01); *H04L 63/1416* (2013.01); *H04L 63/1433* (2013.01); *H04L 63/20* (2013.01)

(58) Field of Classification Search
CPC ............. H04L 63/1425; H04L 43/0829; H04L 43/087; H04L 43/16; H04L 63/1416; H04L 63/1433; H04L 63/20
See application file for complete search history.

(56) References Cited

U.S. PATENT DOCUMENTS 8,528,088 B2 9/2013 Wright et al.
9,467,462 B2 10/2016 Reves
10,177,998 B2 * 1/2019 Parandehgheibi .... G06F 16/122
(Continued)

OTHER PUBLICATIONS

Paudice et al. (An Experiment with Conceptual Clustering for the Analysis of Security Alerts, IEEE, 2014, 7 pages) (Year: 2014).*
(Continued)

*Primary Examiner* — Oleg Korsak
(74) *Attorney, Agent, or Firm* — Polsinelli

(57) ABSTRACT

Systems and methods for causation analysis of network anomalies in a network include detecting an alarm condition at a network device, the alarm condition pertaining to an anomaly or increase in a traffic condition such as packet loss. A dominant key is identified in each of one or more key types which contributed to the alarm condition, the key types including dimensions of traffic flow. Two or more dominant keys of two or more key types are aggregated and clustered to determine a combination of dominant keys which contributed to the alarm condition. A dominant traffic flow comprising the combination of dominant keys which contributed to the alarm condition is identified based on the aggregation and clustering. Malware or security threats can be identified from detecting a dominant source IP address or host which contributed to a predominant number of packet drops or retransmissions at ports of the network.

20 Claims, 12 Drawing Sheets

(56) References Cited

U.S. PATENT DOCUMENTS

| | | | | |
|---|---|---|---|---|
| 10,725,833 | B2* | 7/2020 | Qi | G06F 9/505 |
| 10,873,593 | B2* | 12/2020 | Gandham | H04L 41/145 |
| 10,917,438 | B2* | 2/2021 | Gandham | H04L 63/0823 |
| 2013/0182700 | A1* | 7/2013 | Figura | H04L 43/04 |
| | | | | 370/352 |
| 2014/0215618 | A1* | 7/2014 | Striem Amit | G06F 21/55 |
| | | | | 726/23 |
| 2016/0359740 | A1* | 12/2016 | Parandehgheibi | G06F 16/235 |
| 2016/0359915 | A1* | 12/2016 | Gupta | H04L 43/04 |
| 2017/0302553 | A1* | 10/2017 | Zafer | H04W 28/0236 |
| 2017/0302554 | A1* | 10/2017 | Chandrasekaran | H04L 41/142 |
| 2020/0204448 | A1* | 6/2020 | Nataraj | H04L 47/193 |
| 2021/0160263 | A1* | 5/2021 | Jiang | H04L 43/0829 |

OTHER PUBLICATIONS

Hofmann et al. (Online Intrusion Alert Aggregation with Generative Data Stream Modeling, IEEE, 2011, 13 pages) (Year: 2011).*
Lakhina et al., "Mining Anomalies Using Traffic Feature Distributions," conferences.sigcomm.org, Aug. 21, 2005, pp. 1-12.
Lakhina et al., "Characterization of Network-Wide Anomalies in Traffic Flows," cs.bu.edu, May 19, 2004, pp. 1-12.
Promrit et al., "Traffic Flow Classification and Visualization for Network Forensic Analysis," 2015 IEEE 29th International Conference on Advanced Information Networking Applications, Mar. 2015, pp. 1-12.

* cited by examiner

400

402
- sip: 110.1.1.2, drop_counter: 29754
- sip: 169.254.19.68, drop_counter: 1266
- sip: 10.124.10.145, drop_counter: 1011
- sip: 10.74.9.109, drop_counter: 277
- sip: 192.168.254.13, drop_counter: 140
- sip: 10.75.157.51, drop_counter: 140
- sip: 8.1.27.95, drop_counter: 71
- sip: 10.75.157.52, drop_counter: 71
- sip: 8.1.8.66, drop_counter: 51
- sip: 10.74.3.169, drop_counter: 39
- sip: 10.75.167.131, drop_counter: 37
- sip: 1.0.0.5, drop_counter: 29
- sip: 49.0.0.1, drop_counter: 21
- sip: 192.168.1.3, drop_counter: 18
- sip: 144.0.248.98, drop_counter: 15

404
- sip: 10.75.163.182, drop_counter: 10
- sip: 8.1.9.167, drop_counter: 4
- sip: 10.124.22.62, drop_counter: 4
- sip: 10.124.22.239, drop_counter: 4
- sip: 64.104.169.71, drop_counter: 3
- sip: 10.79.58.201, drop_counter: 3
- sip: 8.1.2.81, drop_counter: 2
- sip: 8.1.2.41, drop_counter: 2
- sip: 172.16.1.178, drop_counter: 2
- sip: 10.75.7.108, drop_counter: 2
- sip: 10.75.167.96, drop_counter: 2
- sip: 10.124.10.42, drop_counter: 2
- sip: 10.106.160.31, drop_counter: 2
- sip: 10.75.167.239, drop_counter: 1
- sip: 10.74.6.72, drop_counter: 1

FIG. 4

| Combination 800 | Key 1 502 | Key 2 504 | Key 3 506 | Key 4 508 | Key 5 510 |
|---|---|---|---|---|---|
| | sip | dip | protocol | if_idx | app_id |
| Num(%) | 110.1.1.2 | 120.1.1.2 | Reserved | Te0/0/0/0.908 | unknown |
| 29754 (90.21%) | | | | | |

FIG. 8

| Source IP | Number of destination IP | Percentage | Destination IP list |
|---|---|---|---|
| 64.102.12.46 | 196 | 63.64% | "View all IP list" |

Source IP analysis, sorted by number of destination IP

DETECT AN ALARM CONDITION AT A NETWORK DEVICE, THE ALARM CONDITION COMPRISING AN ANOMALY OR INCREASE IN A TRAFFIC CONDITION
1002

↓

IDENTIFY A DOMINANT KEY IN EACH OF ONE OR MORE KEY TYPES WHICH CONTRIBUTED TO THE ALARM CONDITION, 1004

↓

AGGREGATE TWO OR MORE DOMINANT KEYS OF TWO OR MORE KEY TYPES TO DETERMINE A COMBINATION OF DOMINANT KEYS WHICH CONTRIBUTED TO THE ALARM CONDITION
1006

↓

IDENTIFY A DOMINANT TRAFFIC FLOW COMPRISING THE COMBINATION OF DOMINANT KEYS WHICH CONTRIBUTED TO THE ALARM CONDITION
1008

FIG. 10

SYSTEMS AND METHODS FOR CAUSATION ANALYSIS OF NETWORK TRAFFIC ANOMALIES AND SECURITY THREATS

TECHNICAL FIELD

The subject matter of this disclosure relates in general to the field of computer networks, and more particularly, to using clustering techniques for identifying root causes of network traffic anomalies and security threats.

BACKGROUND

Computer networks such as enterprise networks can include network devices and nodes distributed across different layers, with traffic flows across a network being influenced by numerous factors. Systems for analyzing traffic flow may be provided for detecting anomalies and outliers in traffic patterns. Such anomalies can be in terms of jitter, retransmission, packet drop counts, etc. Traditionally, the traffic analysis is conducted at a level of network devices, wide area network (WAN) interfaces, applications or traffic classes. When anomalies are detected, an analysis and reporting to a user may be desirable in a format which can allow a deeper understanding of the cause of such anomalies. For example, a report of an issue at a WAN interface can be more useful if it provided further detail on whether the issue is at a WAN link or if the problem arose from a specific flow, application, source IP, destination IP, etc. This additional detail allows the user or auto-controller system to perform further analysis and correction more precisely. A deeper analysis of anomalies can also be useful in identifying security threats to the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates a grouping and clustering of keys in a key type associated with traffic flow, in accordance with some examples;

FIG. 8 illustrates a combination of dominant keys in different key types associated with traffic flow, in accordance with some examples;

FIG. 9 illustrates a combination of keys indicative of security threats, in accordance with some examples;

FIG. 10 illustrates a process of performing causation analysis on a network, in accordance with some examples;

DETAILED DESCRIPTION

Figure 1:
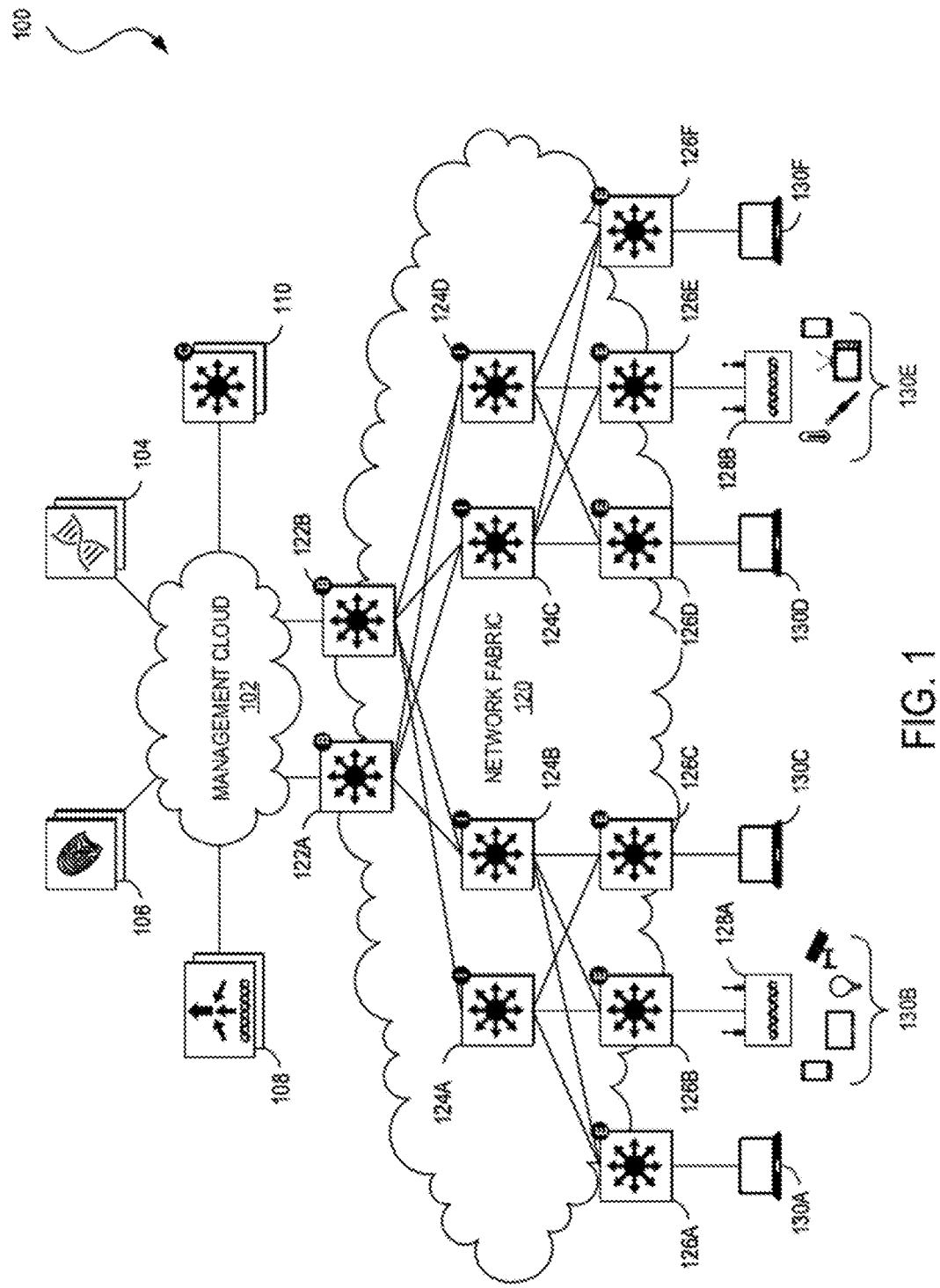
FIG. 1 illustrates a topology of an enterprise network in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for schemes according to which, causation analysis can be conducted in a computer network. In some examples, network traffic can be analyzed to identify the root cause of a network anomaly. The network anomalies can include an alarm condition or outlier value in network conditions such as jitter, retransmissions, packet drops, among others. While the network anomalies detected at a network device can provide an indication of the alarm at a high level, in example aspects of this disclosure, specific traffic flows which may have predominantly contributed to the alarm condition can be identified.

For example, specific traffic flows can be identified based on a combination of keys or identifiers. For example, a 5-tuple packet header format can identify a traffic flow with a combination of keys which include a destination Internet Protocol (IP) address field, a source IP address field, a destination port number field, and source port number field, and a protocol field. In some examples, a network device interface, particular applications associated with the traffic flow, etc., can also be other such keys which can be used to identify the traffic flow.

According to some examples, upon detecting an alarm condition at a network device of a network, the alarm condition including an anomaly or increase in a traffic condition (e.g., jitter, packet drop count, retransmission, latency, etc.), a dominant key in each of one or more key types which contributed to the alarm condition can be identified. The one or more key types can include a source IP address, destination IP address, source port, destination port, protocol, application, or interface, among others. For example, the key types can also include one or more of an application ID, interface ID, Security Group Tag (SGT), Access Point (AP) ID, Wireless Local Area Network (LAN) Controller (WLC) ID, Client Media access control (MAC) address, or a Virtual LAN (VLAN) ID, among others. In some examples, the dominant key in a key type can be identified using clustering techniques (e.g., K-means or Jenks natural break) for clustering the traffic conditions for the key type to determine outliers. In a step-wise approach, the contributions to the alarm condition from two or more dominant keys of two or more key types can be aggregated to determine a combination of dominant keys which contributed to the alarm condition. Using the combination, a dominant traffic flow which contributed to the alarm condition can be identified.

In some examples, a dominant key comprising a dominant source IP address which contributed to a predominant number of packet drops or retransmissions at ports of the network can be determined. Identifying the dominant source IP address can lead to detecting an originator of security threats, such as malware used for scanning ports of the network.

According to some examples, systems and methods for causation analysis of network anomalies in a network include detecting an alarm condition at a network device, the alarm condition pertaining to an anomaly or increase in a traffic condition such as packet loss. A dominant key is identified in each of one or more key types which contributed to the alarm condition, the key types including dimensions of traffic flow. Two or more dominant keys of two or more key types are aggregated and clustered to determine a combination of dominant keys which contributed to the alarm condition. A dominant traffic flow comprising the combination of dominant keys which contributed to the alarm condition is identified based on the aggregation and clustering. Malware or security threats can be identified from detecting a dominant source IP address or host which contributed to a predominant number of packet drops or retransmissions at ports of the network.

In some examples, a method is provided, where the method includes detecting an alarm condition at a network device, the alarm condition comprising an anomaly or increase in a traffic condition in a network, identifying a dominant key in each of one or more key types which contributed to the alarm condition, aggregating two or more dominant keys of two or more key types to determine a combination of dominant keys which contributed to the alarm condition, and identifying a dominant traffic flow comprising the combination of dominant keys which contributed to the alarm condition.

In some examples, a system is provided with one or more processors and a non-transitory computer-readable storage medium containing instructions which. When executed on the one or more processors, the instructions cause the one or more processors to perform operations including detecting an alarm condition at a network device, the alarm condition comprising an anomaly or increase in a traffic condition in a network, identifying a dominant key in each of one or more key types which contributed to the alarm condition, aggregating two or more dominant keys of two or more key types to determine a combination of dominant keys which contributed to the alarm condition, and identifying a dominant traffic flow comprising the combination of dominant keys which contributed to the alarm condition.

In some examples, a non-transitory machine-readable storage medium is provided, which includes instructions configured to cause a data processing apparatus to perform operations. The operations include detecting an alarm condition at a network device, the alarm condition comprising an anomaly or increase in a traffic condition in a network, identifying a dominant key in each of one or more key types which contributed to the alarm condition, aggregating two or more dominant keys of two or more key types to determine a combination of dominant keys which contributed to the alarm condition, and identifying a dominant traffic flow comprising the combination of dominant keys which contributed to the alarm condition.

In some examples of the methods, systems, and non-transitory machine-readable storage media, the traffic condition includes one or more of a jitter, latency, packet drop count, or retransmission.

In some examples of the methods, systems, and non-transitory machine-readable storage media, the one or more key types include one or more of a source IP address, destination IP address, port, protocol, application, interface, among others. For example, the key types can also include one or more of an application ID, interface ID, Security Group Tag (SGT), Access Point (AP) ID, Wireless Local Area Network (LAN) Controller (WLC) ID, Client Media access control (MAC) address, or a Virtual LAN (VLAN) ID, among others.

In some examples of the methods, systems, and non-transitory machine-readable storage media, identifying the dominant key in a key type includes grouping and clustering the traffic condition pertaining to the key type to determine outliers.

In some examples of the methods, systems, and non-transitory machine-readable storage media, aggregating the two or more dominant keys includes ordering the two or more keys into an ordered set based on their individual contributions to the alarm condition, and aggregating contributions from combinations of the two or more dominant keys to determine whether a combination of two or more dominant keys have a contribution greater than a predetermined threshold to the alarm condition. In some examples, the aggregating further includes eliminating least contributing dominant keys from the ordered set in a stepwise manner until the combination of two or more dominant keys having the contribution greater than the predetermined threshold to the alarm condition is obtained.

In some examples the methods, systems, and non-transitory machine-readable storage media further include determining a dominant key comprising a dominant source IP address which contributed to a predominant number of packet drops or retransmissions at ports of the network device, and identifying the dominant source IP address to include an originator of malware for scanning the network. In some examples packet drops or retransmissions are collected at a collector from different routers of the network at which packets from the dominant source IP address were received and dropped.

Description of Example Embodiments

Disclosed herein are systems, methods, and computer-readable media for schemes according to which, causation analysis can be conducted in a computer network. In some examples, network traffic can be analyzed to identify the root cause of a network anomaly. The network anomalies can include an alarm condition or outlier value in network conditions such as jitter, retransmissions, packet drops, among others. While the network anomalies detected at a network device can provide an indication of the alarm at a high level, in example aspects of this disclosure, specific traffic flows which may have predominantly contributed to the alarm condition can be identified.

In traditional systems for analyzing traffic to detect anomalies such as jitter, retransmission, packet drop counts, etc., the analysis is conducted at a network device, a wide area network (WAN) interfaces, one particular applications, one or more traffic classes, or the like. When anomalies are detected at a high level using such traditional analysis, reporting such high level analysis to a user may not be useful in identifying the cause of the anomalies. The user or an operator may desire the presentation of the analysis in a format which can allow a deeper and more specific understanding of particular traffic flows which may have led to the anomalies or alarm conditions in the network.

For example, providing the user with a report which identifies an issue at a WAN interface may not be particularly useful; however, a report which can identify a specific WAN link or a specific flow, application, source IP, destination IP, etc., which predominantly contributed to the issue can be useful. In some examples, the flow can also be specified based on one or more of an application ID, interface ID, Security Group Tag (SGT), Access Point (AP) ID, Wireless Local Area Network (LAN) Controller (WLC) ID, Client Media access control (MAC) address, or a Virtual LAN (VLAN) ID, among others. For example, this additional detail can allow the user or an auto-controller system to perform further analysis and/or implement corrective measures.

In some cases, the ability to perform a deeper analysis of anomalies can also be useful in identifying security threats. For example, some malware may perform IP scanning, which involves sending packets to all or numerous ports/IP addresses in a network, which can result in dropped packets and indications of packets being unreachable for certain ports/addresses which are not yet instantiated or not currently in use. Being able to determine a common source for such common behavior detected at different ports/IP addresses can lead to an indication that there may be a common origin, potentially a source of malware.

In example aspects of this disclosure, systems and techniques are described for obtaining a deep analysis or causation analysis of network anomalies in a network such as an enterprise network. For example, network anomalies detected at a high level can be further analyzed using example algorithms for clustering and machine learning to determine whether the detected anomalies impact all network traffic or only a subset or class of the traffic flow. If only a subset of traffic flow is determined to be the predominant cause for the network anomaly, a particular flow or a small number of flows which may be predominantly causing the network anomaly can be identified (e.g., a specific combination of source and/or destination IP addresses, source and/or destination ports, protocols, etc.). The particular flow can then be reported for possible corrective measures and/or further analysis.

In an example, a count of dropped packets (drop counts) is used to illustrate a type of anomaly which can be analyzed. Similar analysis can apply to jitter, retransmission, etc. A network device such as a network assurance system can detect an alarm condition or anomaly based on a global count of packet drops (or global drop count) in a network. This global count would provide a total of drop counts which can be attributed to different types of keys, where the key types can include particular IP addresses, ports, protocols, applications, interfaces, etc. Using conventional network analysis, it is difficult to identify a specific combination of predominant keys of the different key types which may be an outlier contributing to an anomaly or increase in the global count. However, in example aspects, the specific combination can be obtained as follows. In some examples, the following process can be implemented at the network device such as the network assurance system.

In an example implementation, the drop counts per key type can be clustered one at a time. For example, for a first key type which includes source IP addresses, drop counts for various source IP addresses detected by the network device are identified and clustered into two or more groups. Clustering algorithms such as K-means or Jenks natural break can be used in some examples. This process of clustering can be initiated when there is an alarm or trigger condition, such as a high global drop count detected at the network device. From the clusters, a small number, e.g., a particular source IP which may have contributed significantly to the alarm/increase in global drop count can be identified as a dominant key of the first key type (e.g., a source IP from which >90% of the global drop counts originated).

A similar analysis can be performed for other key types, such as a second key type (e.g., destination IP addresses or destination ports), a third key type (e.g., a protocol), a fourth key type (e.g., applications), and a fifth key type (e.g., interfaces). Although not discussed in more detail, other key types can include an application ID, interface ID, Security Group Tag (SGT), Access Point (AP) ID, Wireless Local Area Network (LAN) Controller (WLC) ID, Client Media access control (MAC) address, Virtual LAN (VLAN) ID, etc. If a similar dominant key is identified for each of these key types then an aggregation of various combinations of the dominant keys is performed to identify a particular combination (if any) of the dominant keys which may have contributed to the global drop count.

For example, a combination of all five dominant keys of the five key types which can contribute to greater than a threshold (e.g., 90%) of the global drop count can be identified in a step-wise approach which will be explained in further detail below. In some examples of the step-wise approach, in each step, dominant keys with the highest contributions can be included in a combination and their contributions can be aggregated, while excluding dominant keys with lower contributions. Depending on whether the aggregation exceeds a threshold, other combinations can be attempted, e.g., by including a different key type and/or excluding a different key type. After such aggregation and clustering, a dominant flow which includes a combination of dominant keys whose combined contribution exceeds the threshold is determined.

In some examples, the above technique which can identify a source IP which contributes significantly to a global packet drop or retransmission count can also lead to detection of possible malware. For example, if the source IP is detected as a dominant address from which packets sent to various ports/destination IPs were dropped, it can indicate that the source IP is scanning ports or IP addresses of the network, and further analysis and/or preventive measures can be put in place accordingly.

For example, a software defined WAN (SD-WAN) router can monitor a count of transport control protocol (TCP) re-transmissions per traffic class per WAN interface, and detect an anomaly that TCP re-transmissions are unexpectedly high. To resolve this, the SD-WAN controller may decide to move some traffic to another WAN interface. However, this can involve moving an entire subnet or traffic class rather than only specific flows which may have caused the TCP performance issues. If only specific flows have the TCP re-transmission issue, then it may be more cost effective to move the traffic of only the affected flows to another WAN link.

A deeper analysis of anomalies can also be useful in identifying security threats. For example, some malware may perform IP scanning, which involves sending packets to all or numerous ports/IP addresses in a network, which can result in dropped packets and indications of packets being unreachable for certain ports/addresses. Being able to determine a common source for the anomalies detected at different ports/IP addresses can lead to identifying the origin of potential malware. The following sections describe systems and methods for identifying a root cause of network anomalies.

FIG. 1 illustrates an example of a topology of an enterprise network 100 which may be configured according to aspects of this disclosure. For example, the enterprise network 100 may include a wired network whose traffic may be monitored according to example techniques herein. In one example, the enterprise network 100 may provide intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some examples, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., Virtual Extensible Local Area Network or "VXLAN") from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some examples, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some examples, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
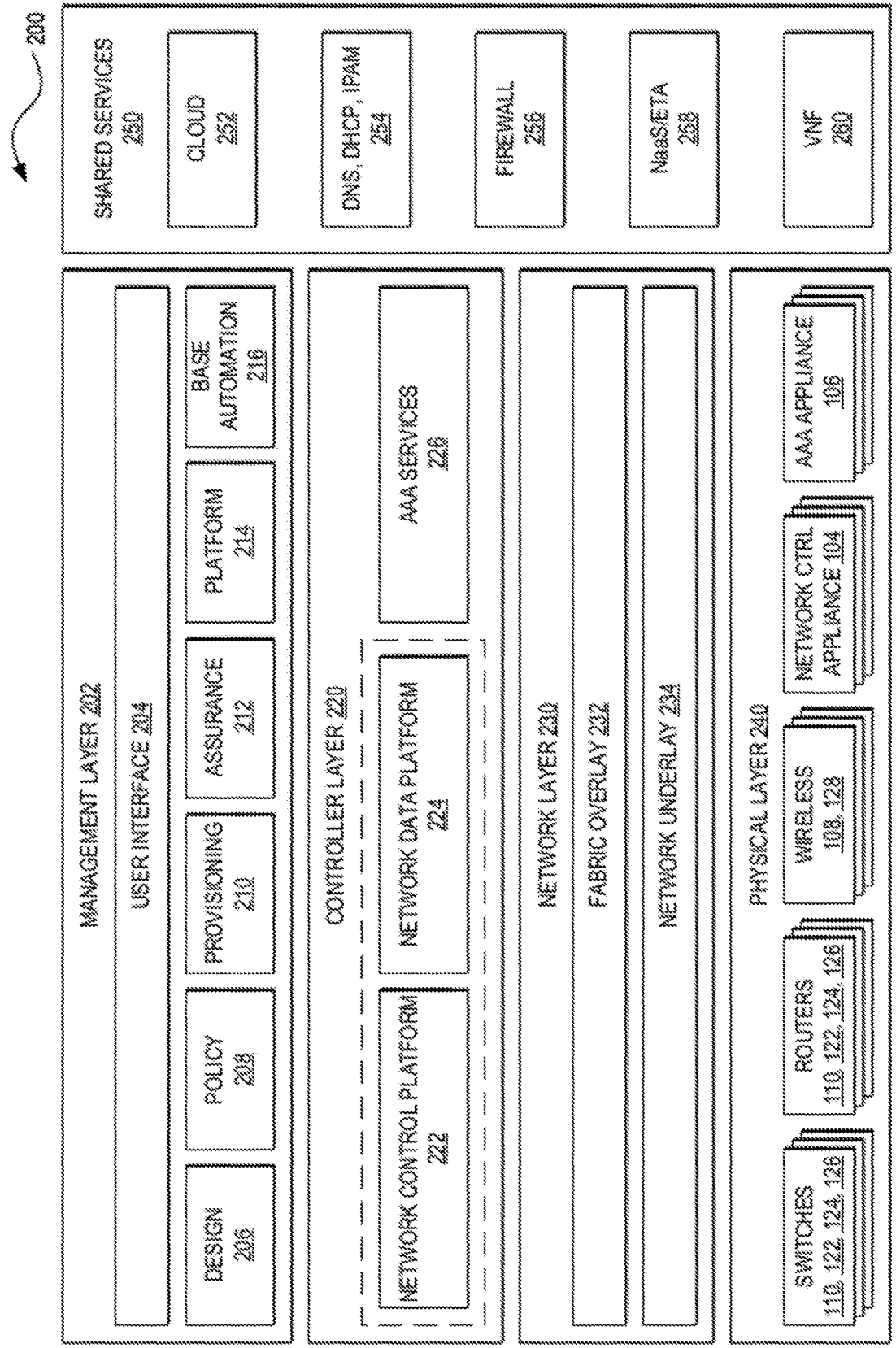
FIG. 2 illustrates a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some examples, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

Figure 3:
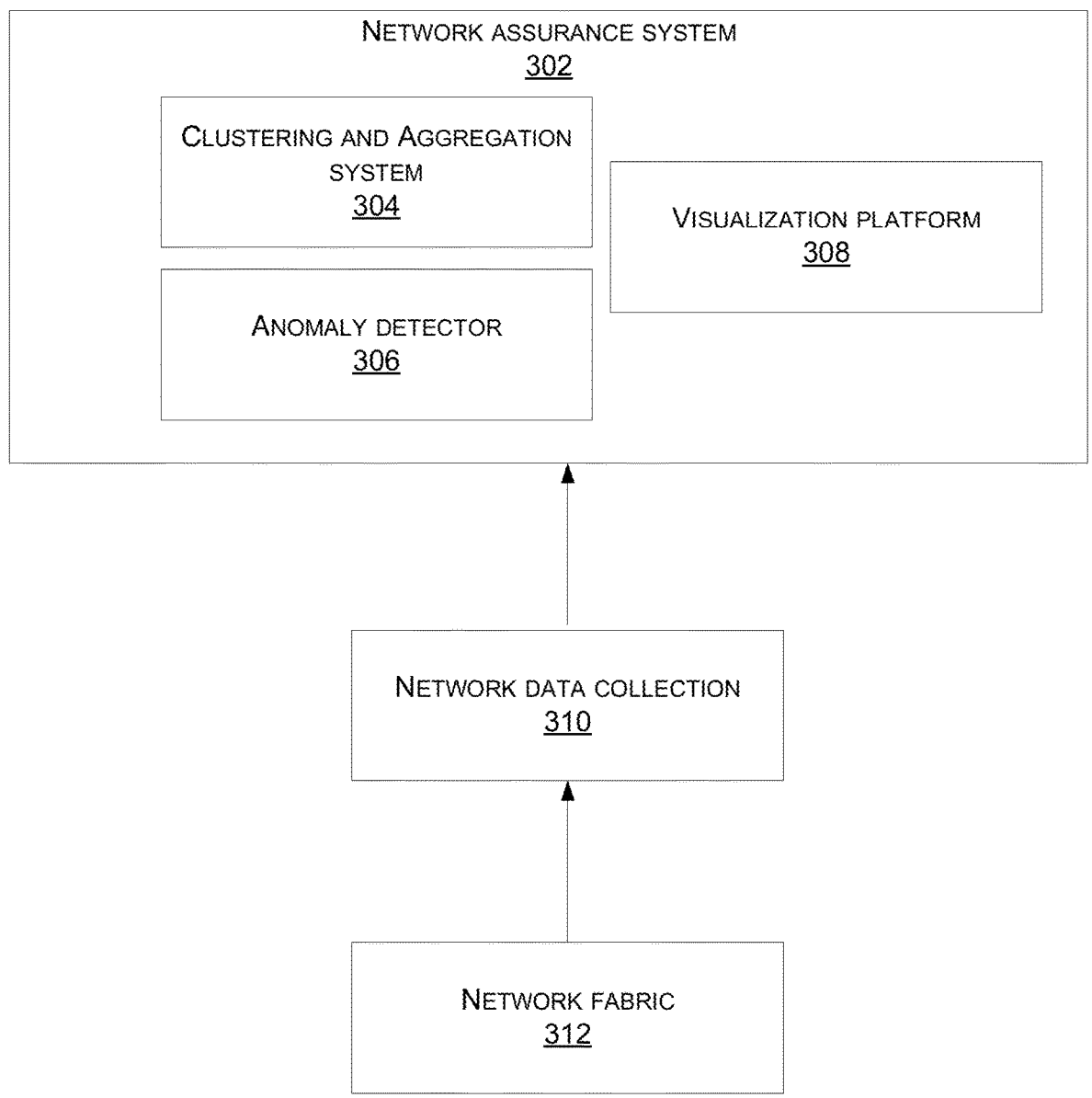
FIG. 3 illustrates a network configured for causation analysis of network anomalies, in accordance with some examples.

FIG. 3 is a block diagram which illustrates aspects of a network 300 according to this disclosure. The network 300 can also include an enterprise network such as the enterprise network 100 shown and described with reference to FIG. 1. The network 300 can include a network fabric 312, such as the network fabric 120 shown and described with reference to FIG. 1. A network data collection platform 310 can collect data related to traffic flow across the network fabric 312, and in some examples, provide the collected data to a network assurance system 302 of the network 300.

The network assurance system 302 can be configured to perform functions similar to the assurance functions 212 described with reference to the logical architecture 200 for the enterprise network shown in FIG. 2. For example, the network assurance system 302 can use machine learning and/or other data analytics tools to provide end-to-end visibility of the network 300 by learning from the network infrastructure, endpoints, and other contextual sources of information. In some examples, the network assurance system 302 can include tools for identifying one or more causes of anomalies in the network 300.

For example, the network assurance system 300 can obtain information pertaining to the traffic flow in the network fabric 312 from the network data collection platform 310, where the information can include jitter, retransmission counts, packet drops, latencies, etc. An anomaly detector 306 provided in the network assurance system 302 can analyze the traffic information and detect anomalies, alarm conditions, etc. In some examples, the anomaly detector 306 may employ machine learning tools to automatically detect network problems or anomalies based on applying learned metrics and thresholds to the information. For example, time-series based anomaly detection or k-nearest-neighbors (KNN)-based anomaly detection can identify periods in which traffic throughput is lower than expected in the network 300. The anomaly detector 306 can also employ user-defined rules to detect any spikes or variances in different traffic metrics across a specified time period. For example, if counts of packet drop count, jitter, latency, errors, retransmissions, etc., exceed an expected or user defined threshold within a specified time period, the anomaly detector 306 may flag an alarm condition.

The network assurance system 302 can also include a clustering and aggregation system 304 which can receive a notification of an alarm condition from the anomaly detector 306 and perform a deeper analysis according to aspects of this disclosure. For example, the clustering and aggregation system 304 can receive an alarm condition from the anomaly detector 306 which indicates that a global packet drop count across all or many network devices in the network fabric 312 is unexpectedly high (e.g., above a predefined or machine-learning based threshold value) for a period of time (also referred to as an alarm duration). The clustering and aggregation system 304 can receive traffic information from the network data collection platform 310, for example, regarding drop counts which can be attributed to different types of keys, where the key types can include particular IP addresses, ports, protocols, applications, interfaces, etc. of the traffic flow across the network 300. In some examples, the clustering and aggregation system 304 can perform the clustering and aggregation functions which will be described further below to determine a smaller subset (e.g., a specific combination) of one or more keys across the different key types which may have predominantly contributed to the alarm condition. In some examples, the clustering and aggregation system 304 can also identify a root cause of the alarm condition to be a security threat which can originate from a common source.

The clustering and aggregation system 304 can present the results of the clustering and aggregation to a visualization platform 308 which can be included in the network assurance system 302. The visualization platform 308 can include a user interface and/or an interface to a controller or other platform for performing additional analysis and/or implement corrective measures.

FIG. 4 illustrates a snapshot 400 which can include aspects of a clustering performed by the clustering and aggregation system 304. In an example, the anomaly detector 306 may provide an indication of an alarm condition to the clustering and aggregation system 304. The alarm condition can include a global drop count being above a predetermined threshold. The clustering and aggregation system 304 can cluster drop counts for various key types. In the snapshot 400, a clustering of a first key type pertaining to source IP addresses (SIP) based on drop counts associated with the source IP addresses is shown. In some examples, the snapshot 400 can also be generated from information provided by a network analysis tool such as a topN chart.

In an example, the clustering and aggregation system 304 can cluster the SIPs using clustering algorithms such as K-means or Jenks natural break can be used in some examples. In an example, the clustering and aggregation system 304 can break down the SIPs in the snapshot 400 into two or more groups based on certain criteria associated with the SIPs. For example, a first group 402 and a second group 404 are shown in FIG. 4. The first group 402 can include SIPs whose average drop counts (averaged across drop counts within the first group 402) are greater than the average drop counts of the second group 404. In some examples, a threshold value of drop counts can be used to separate the groups into the two groups. In some examples, the SIPs in the first group 402 may have contributed to the alarm condition during the alarm duration. In some examples, the first group 402 can include a smaller number of SIPs which can contribute to a significant portion of the global drop count.

If one or more of the criteria above are met, then one or more of the keys in the first key type can be identified as candidates to be considered for determining a combination of dominant keys. For example, upon grouping into the first group 402 and the second group 404, a specific key for the SIP shown as SIP: 110.1.1.2 can be identified in the first group 402, with a significantly high drop count (29,754) in comparison to drop counts associated with other SIPs in the first group 402 (and correspondingly, in comparison to the second group 404 as well because the drop counts of all SIPs in the first group 402 are higher than the drop counts of all SIPs in the second group 404 in the example shown). In an example, the drop count of 29,754 for the dominant SIP, SIP: 110.1.1.2, can constitute 90.21% of the global drop counts detected by the anomaly detector 306. The clustering and aggregation system 304 can implement a threshold value for determining one or more specific keys as being predominant keys within a key type. To illustrate an example aspect, the threshold for the first key type can be 90%, based on which the clustering and aggregation system 304 can determine that SIP: 110.1.1.2 is a dominant key (which may alternatively be referred to as key 1) of the first key type.

In some examples, the clustering and aggregation system 304 can similarly group and cluster drop counts for other dimensions, tuples, or key types as well. For example, a similar analysis as above for the first key type related to the SIPs can be performed for other key types, such as a second key type (e.g., destination IP addresses), a third key type (e.g., a protocol), a fourth key type (e.g., interface), and a fifth key type (e.g., application). Among other tuples or dimensions such as source ports and destination ports can also be included in the grouping and clustering.

Figure 5:
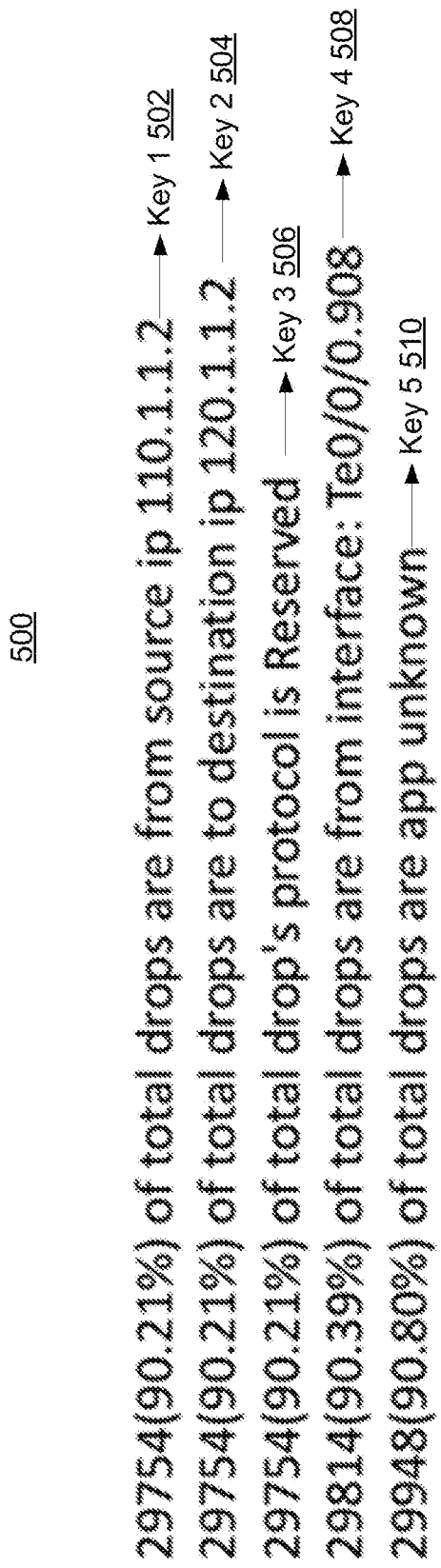
FIG. 5 illustrates an example of dominant keys in different key types associated with traffic flow, in accordance with some examples.

FIG. 5 illustrates an example listing 500 of dominant keys in the five key types identified above. For example, key 1 502 includes the sip 110.1.1.2 for the first key type discussed above. Similarly, key 2 504 associated with a destination IP address or DIP 120.1.1.2 can be identified as a dominant destination IP address for the second key type; key 3 506 associated with a reserved protocol can be identified as a dominant protocol for the third key type; key 4 508 associated with an interface Te0/0/0.908 can be identified as a dominant interface for the fourth key type; and key 5 510 associated with an unknown application can be identified as a dominant application for the fifth key type. Although the illustrative example of FIG. 5 shows one dominant key per key type, in some examples, there may be more than one dominant key in one or more key types. In some examples, the listing 500 of the dominant keys in the different key types can be presented in an intermediate step to a user or to the visualization platform 308.

Further analysis can be conducted on the listing 500 to detect root causes of the alarm condition. For example, even though the key 1 502 (SIP 110.1.1.2) and the key 2 504 (DIP 120.1.1.2) have been identified as dominant keys based on the grouping and clustering within their respective key types, determining whether a predominant proportion of the packets which originated from the SIP 110.1.1.2 and flowed to the DIP 120.1.1.2 may have contributed to the alarm condition can provide further insight into the root cause of the alarm condition. Similarly, identifying the various combinations of key types can provide a combination indicative of a specific flow which may be problematic. In order to determine whether combinations of keys in different key types may have been dominant contributors to the alarm condition, aggregation of the drop count contributions from the different key types can be performed. However, for N keys, $2^N$ combinations are possible (e.g., 32 combinations for the five keys in different key types shown in the listing 500). This number grows exponentially with more keys or dimensions being combined. In order to reduce the complexity of aggregation, the number of combinations used can be minimized using example algorithms described herein.

Figure 6:
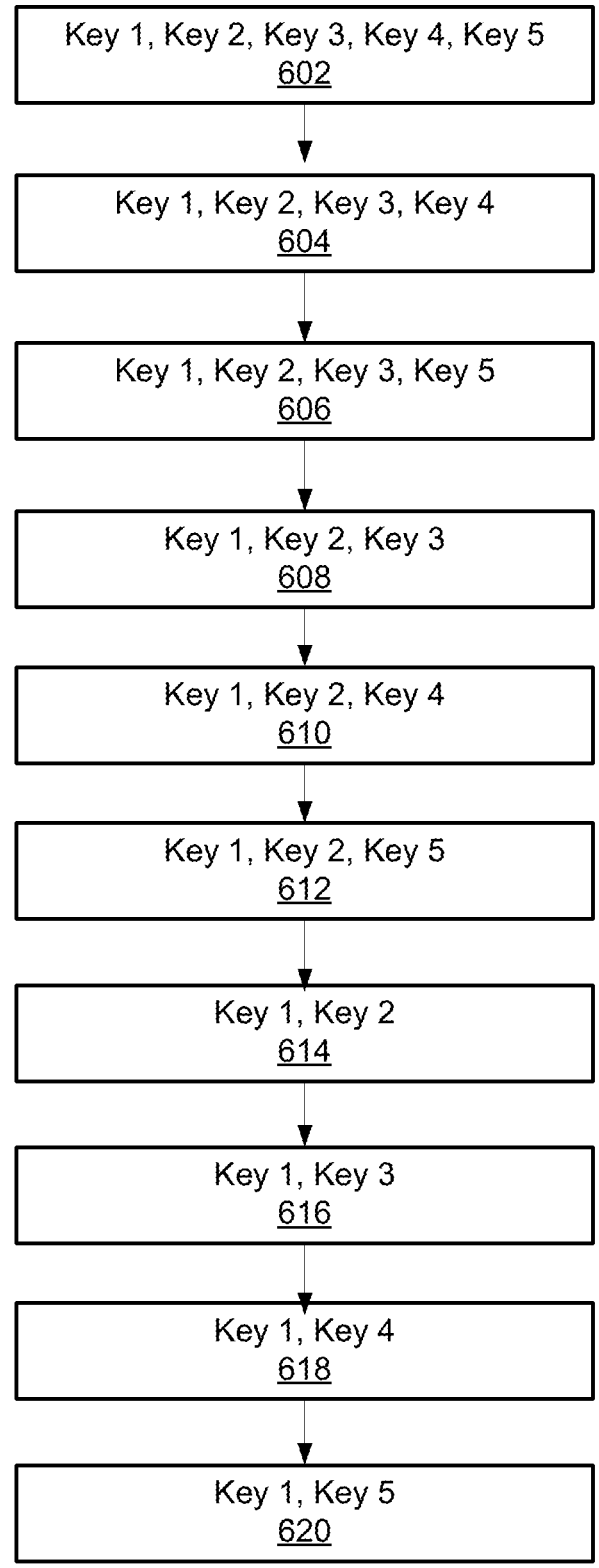
FIG. 6 illustrates a process of aggregating a combination of dominant keys in different key types associated with traffic flow, in accordance with some examples.

FIG. 6 illustrates a process 600 corresponding to an example algorithm for aggregating two or more key types to identify dominant combinations. The process 600 starts with block 602 where a combination of all keys: key 1, key 2, key 3, key 4, and key 5 is considered. For the sake of an illustrative example, the contributions (e.g., a percentage or other proportion) of each of these keys to the drop counts of their respective key types is arranged in an ordered set, ordered from high to low contributions to the drop count, with key 1 having the highest drop count proportion, and key 5 having the lowest. The drop count contribution for this combination is determined by aggregating the drop count contributions from each of the keys in this combination. If the drop count contribution at the block 602 is higher than a predetermined threshold, say 90%, then it may be determined that the combination of all the keys in the block 602 is a dominant combination, and in some examples, this combination can be reported as the dominant flow to the visualization platform 308.

On the other hand, if the combination in the block 602 does not have an aggregated drop count contribution greater than the threshold, then the process 600 proceeds to block 604 where a key having the smallest individual contribution is dropped. For example, if key 5 has the smallest contribution, then key 5 can be dropped and the contributions from the combination of one less than all keys: key 1, key 2, key 3, and key 4 can be aggregated. If in block 604, the combination of key 1, key 2, key 3, and key 4 is greater than the threshold, then this combination in block 604 can be determined to be a dominant combination, and in some examples, this combination can be reported as the dominant flow to the visualization platform 308.

On the other hand, if the combination in the block 606 does not have an aggregated drop count contribution greater than the threshold, then the process 600 proceeds to block 606 where a key having the second smallest individual contribution is dropped and the key with the smallest contribution which was dropped in the block 604 is added to the combination in the block 606. For example, key 4 can be dropped and key 5 can be added back in to result in another combination of one less than all keys: key 1, key 2, key 3, and key 5, which can be aggregated. If in block 606, the combination of key 1, key 2, key 3, and key 5 is greater than the threshold, then this combination in block 606 can be determined to be a dominant combination. In some examples, this combination can be reported as the dominant flow to the visualization platform 308.

The process 600 can continue in the above manner to a combination of two less than all keys as shown in the blocks 608, 610, and 612, where a combination of three keys is shown, each with two of the lowest three keys dropped and the combination aggregated. In some examples, if a dominant combination is found in one of the blocks 608, 610, and 612, the combination can be reported as the dominant flow to the visualization platform 308.

If the blocks 608, 610, and 612 also do not result in the dominant combination being found, then the process 600 proceeds to the blocks 614, 616, 618, and 620 where combinations with three less than all keys are aggregated. In the blocks 614, 616, 618, and 620, three out of the four least contributing keys are dropped and the remaining keys are combined, in this case to determine aggregations of two keys in each of these blocks. In some examples, if a dominant combination is found in one of the blocks 614, 616, 618, and 620, the combination can be reported as the dominant flow to the visualization platform 308.

In the case of five keys, the process 600 stops at block 620 once all combinations of two or more keys are exhausted in the order described. In general, for N keys, the algorithm described by the process 600 can include (N−1)! combinations (or N−1 factorial combinations), where for 5 keys, (5−1)! is 4! or 10. Although (N−1)! According to the process 600 is significantly smaller than $2^N$ total possible combinations for N keys, for larger values of N, or if further time-efficient processes are desired, a greedy algorithm can be adopted.

Figure 7:
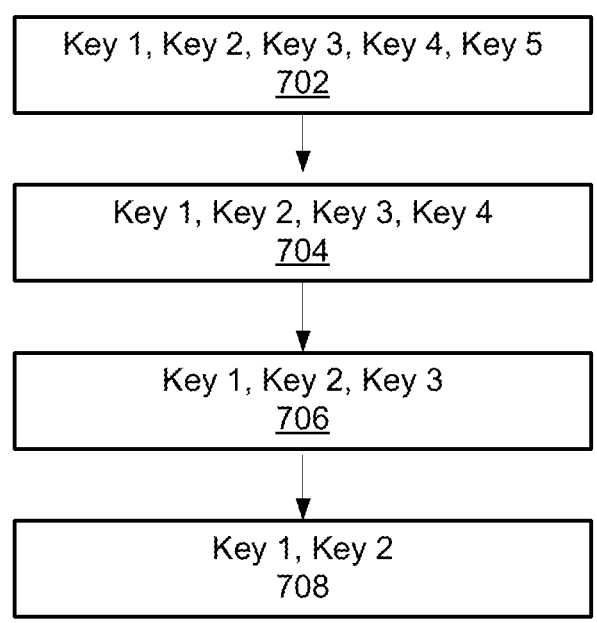
FIG. 7 illustrates another process of aggregating a combination of dominant keys in different key types associated with traffic flow, in accordance with some examples.

FIG. 7 illustrates a process 700 corresponding to another example algorithm for aggregating two or more key types to identify dominant combinations. The process 700 can be referred to include a greedy algorithm to obtain a local optimum. The process 700 starts with block 702 where a combination of all keys: key 1, key 2, key 3, key 4, and key 5 is considered and a drop count contribution for this combination is determined by aggregating the drop counts from each of the keys in this combination. Once again, the contributions (e.g., a percentage or other proportion) of each of these keys to the drop counts of their respective key types is arranged in order from high to low, with key 1 having the highest drop count proportion, and key 5 having the lowest. If the drop count at the block 702 is higher than a predetermined threshold, say 90%, then it may be determined that the combination of all the keys in the block 702 is a dominant combination, and in some examples, this combination can be reported as the dominant flow to the visualization platform 308.

On the other hand, if the combination in the block 702 does not have an aggregated drop count greater than the threshold, then the process 700 deviates from the process 600. The process 700 proceeds to block 704, and then possibly to one or more of the blocks 706 and then 708, in that order, where in each of the blocks 704-708, a number of least contributing keys are dropped without adding back in any other keys.

FIG. 8 illustrates an example combination 800 of the keys 1-5, 502-510 which can be determined from the process 600 or 700 to be a dominant combination. For example the combination 800 can be determined at the block 602 or 702 to include all five keys, without having to proceed to the subsequent blocks. This combination 800 can correspond to a specific traffic flow which may have contributed in a dominant manner or an outlier fashion (e.g., greater than a threshold such as 90%) to the alarm condition.

In some examples, determining the dominant flows such as the combination 800 can also take into account the static information provided by a network analysis tool such as a topN chart. For example, the clustering and aggregation system 304 can determine the combination 800 or other dominant flow which can be used to enhance the output of static information provided by topN charts or other graphical user interface (GUIs). For example, the topN chart can provide information regarding the SIPs and associated drop counts shown in the snapshot 400 of FIG. 4, and using example algorithms of this disclosure (e.g., the process 600 or 700 or using other machine learning, artificial intelligence based learning techniques) the clustering and aggregation system 304 can perform the grouping and clustering techniques on these static outputs to obtain the dominant key types, dominant combinations, etc.

In some examples, the combination 800 can be presented to the visualization platform 308 for further analysis or to prompt corrective actions to be taken. In some examples, a combination of two or more drop counts may not be determined as dominant combinations. For example, at the block 620 or 708, it may be determined that the combination of the two keys in the last block do not aggregate to a contribution greater than the threshold, and as such, there may not be a dominant combination, but rather the alarm condition may have been due to a global issue in the network 300. While the example above discusses the alarm condition in terms of dropped packet counts, similar techniques can be used for alarm conditions in terms of other network conditions or anomalies in terms of jitter, latency, retransmissions, etc.

In some examples, the above manner of clustering can also be utilized to identify a source of security threat to the network, such as the network 300 of FIG. 3. For example, the network 300 can be attacked by injecting a network node or host by malware referred to as worm malware, where the affected host may be manipulated to inject the malware to other hosts using various vulnerabilities within the network. Once such malware is injected into a host or network device of the network 300, for example, the malware may cause this network device to perform functions such as IP scanning of the network, where numerous or all IP addresses of the network are scanned across a wide IP address space. The scanning can utilize techniques such as Internet Control Message Protocol (ICMP) sweeping pings, telnet sweeping, TCP synchronization (SYN) on prominent or known ports of the network, sending User Datagram Protocol (UDP) packet to ports with security backdoors in the network, etc.

However, there may be many IP addresses in the network which have not been assigned at the time the scanning is performed. Correspondingly, packets sent to these destination IP addresses from an infected host will be dropped by a last hop router in the network before the destination is reached. In some examples, even if some destination IP addresses are assigned, but the port and protocol encapsulated in a packet sent to these destination IP addresses are not monitored by the network, the packets may be discarded. Thus, it is possible to measure a number of unreachable IP addresses, in conjunction with port and protocol combinations related to a specific host using the above-described aggregation and clustering techniques. In some examples, the source IP address of the infected host can be determined based on a high number (e.g., greater than a predetermined threshold) of packet drops to different destination IP addresses originating from the source IP address. Further analysis can be performed to determine whether such a source IP address belongs to a host in the network which is scanning the IP/port/protocol addresses in the network.

In some examples, packets dropped by the last hop router can be sent from the router to a collector. For example, an extension of existing packet drop notifications from routers/switch hardware can be utilized to include the notification regarding the source IP addresses of hosts which may be potentially scanning the network. In some examples, the notifications to the collectors can employ other switching platforms (e.g., using Doppler).

In some examples, for packets dropped by a host, a router/switch can replicate an ICMP Type 3 unreachable packet type and send it to the collector using an Access Control List (ACL) classification, where the collector can obtain the ICMP type/code from the packet and determine the IP/port/protocol of the original dropped packet.

A collector or controller of the network can collect the dropped packet statistics and/or ICMP Type 3 packets, and build a flow distribution table. The collector can be included in the clustering and aggregation system 304 in some examples, to generate the dominant combination of source IP addresses to be included in the flow distribution table. For ICMP Type 3 packets, the flow distribution table can be built using original packets in ICMP Type 3 packet payloads. In addition to building the flow distribution table, the collector can perform further analysis (e.g., using signature based Intrusion Protection System (IPS) software) on the replicated dropped packets to determine whether they contain or are originated from known malware. In some examples, the collector can also program routers to monitor all the traffic from the identified source IP address to perform further analysis using the signature-based IPS software. If the host at the source IP address is determined to be infected by malware and/or is performing IP/Port/protocol scanning, the collector can utilize ACL to the block the host from the network, among other corrective measures which may be possible.

FIG. 9 illustrates an example result 900 of analysis performed on a suspected host for malware infection. For example, the result 900 may be obtained from the visualization platform 308 upon the collector having conducted the IPS analysis on replicated/dropped packets reported from routers. Using the aforementioned clustering and aggregation schemes, a source IP address 902 can be determined to send packets to a large number of destination IP addresses, where the filed 904 shows the destination IP addresses to which packets were dropped. The field 906 indicates the percentage of packet drops associated with the source IP address 902. The field 908 can provide a list of the destination IP addresses to which packets were dropped. Accordingly, further analysis on the source IP address 902 can be conducted to determine whether it belongs to a host affected by malware and/or a host performing scanning.

Accordingly, aspects of this disclosure are directed to efficient techniques for determining dominant contributions among one or more key types for detecting root causes of network conditions such as alarms, security threats, etc.

FIG. 10 illustrates a process 1000 according to example aspects. The process steps or blocks of the process 1000 outlined herein are examples and can be implemented in any combination thereof, including combinations that exclude, add, or modify certain blocks.

At the block 1002, the process 1000 can include detecting an alarm condition at a network device. For example, the alarm condition can include an anomaly or increase in a traffic condition in a network. In some examples, the traffic condition can include one or more of a jitter, packet drop count, or retransmission. In some examples, the alarm condition can be detected by the anomaly detector 306. In some examples, the alarm condition can pertain to a security threat, and a collector may receive dropped packets from last hop routers to detect alarm conditions.

At the block 1004, the process 1000 can include identifying a dominant key in each of one or more key types which contributed to the alarm condition. For example, the one or more key types can be dimensions or tuples which define a traffic flow. In some examples, the key types can include one or more of a source IP address, destination IP address, port, protocol, application, or interface. In some examples, the key types can also include one or more of an application ID, interface ID, Security Group Tag (SGT), Access Point (AP) ID, Wireless Local Area Network (LAN) Controller (WLC) ID, Client Media access control (MAC) address, or a Virtual LAN (VLAN) ID, among others. In some examples, identifying the dominant key in a key type includes clustering the traffic conditions for the key type to determine outliers. For example, the clustering and aggregation system 304 may conduct the grouping and clustering identified in FIG. 4 to determine an outlier in SIPs. Similar outliers detected for various key types are identified as keys 1-5 502-510 in FIG. 5.

At the block 1006, the process 1000 can include aggregating two or more dominant keys of two or more key types to determine a combination of dominant keys which contributed to the alarm condition. For example, the clustering and aggregation system 304 can implement algorithms such as those shown in process 600-700 to cluster and aggregate the dominant keys from different key types to determine whether a dominant combination exists.

At the block 1008, the process 1000 can include identifying a dominant traffic flow comprising the combination of dominant keys which contributed to the alarm condition. For example, as shown in FIG. 8, the clustering and aggregation system 304 can determine a combination 800 which includes the combination 800 of the keys 1-5 502-510 to define a dominant traffic flow which contributed to the alarm condition.

Figure 11:
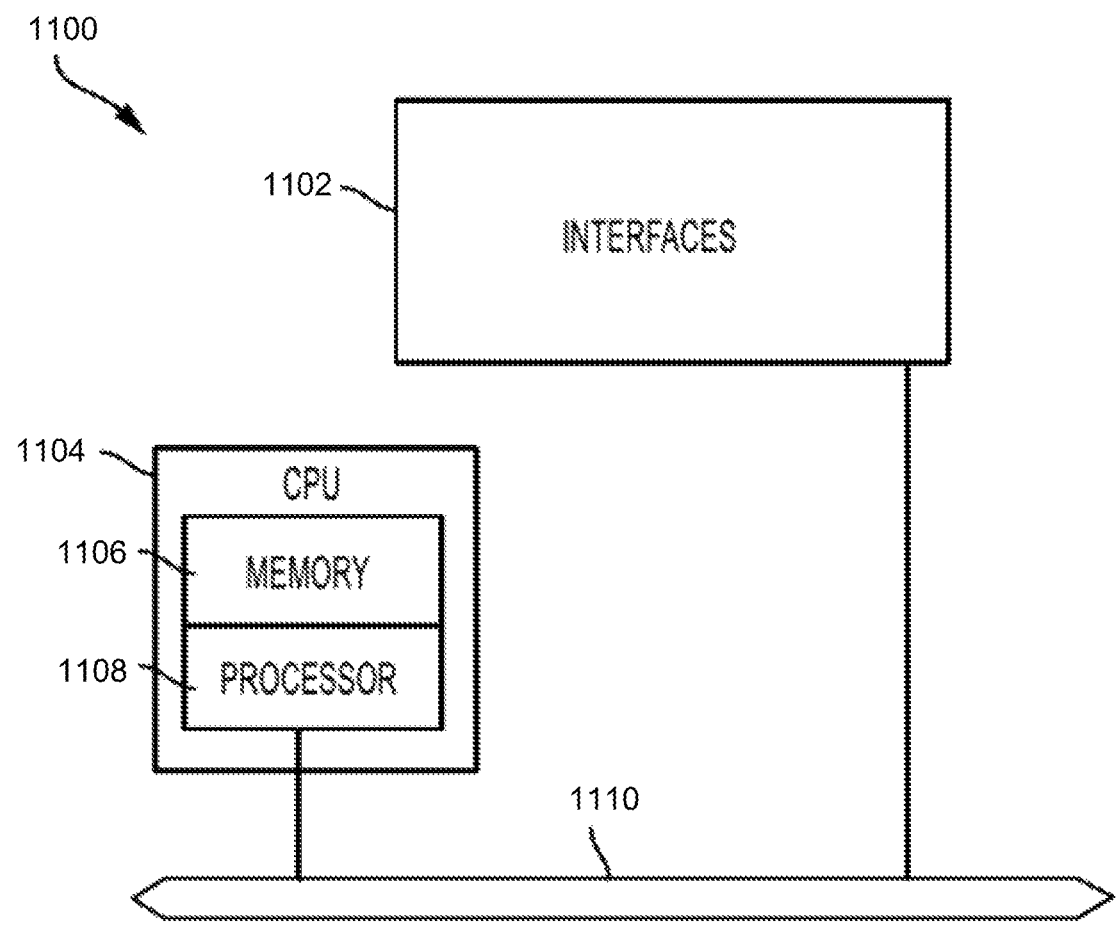
FIG. 11 illustrates an example network device in accordance with some examples.

FIG. 11 illustrates an example network device 1100 suitable for implementing the aspects according to this disclosure. In some examples, the network assurance system 302 may be implemented according to the configuration of the network device 1100. The network device 1100 includes a central processing unit (CPU) 1104, interfaces 1102, and a connection 1110 (e.g., a PCI bus). When acting under the control of appropriate software or firmware, the CPU 1104 is responsible for executing packet management, error detection, and/or routing functions. The CPU 1104 preferably accomplishes all these functions under the control of software including an operating system and any appropriate applications software. The CPU 1104 may include one or more processors 1108, such as a processor from the INTEL X86 family of microprocessors. In some cases, processor 1108 can be specially designed hardware for controlling the operations of the network device 1100. In some cases, a memory 1106 (e.g., non-volatile RAM, ROM, etc.) also forms part of the CPU 604. However, there are many different ways in which memory could be coupled to the system.

The interfaces 1102 are typically provided as modular interface cards (sometimes referred to as "line cards"). Generally, they control the sending and receiving of data packets over the network and sometimes support other peripherals used with the network device 1100. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 1104 to efficiently perform routing computations, network diagnostics, security functions, etc.

Although the system shown in FIG. 11 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 1100.

Regardless of the network device's configuration, it may employ one or more memories or memory modules (including memory 1106) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 1106 could also hold various software containers and virtualized execution environments and data.

The network device 1100 can also include an application-specific integrated circuit (ASIC), which can be configured to perform routing and/or switching operations. The ASIC can communicate with other components in the network device 1100 via the connection 1110, to exchange data and signals and coordinate various types of operations by the network device 1100, such as routing, switching, and/or data storage operations, for example.

Figure 12:
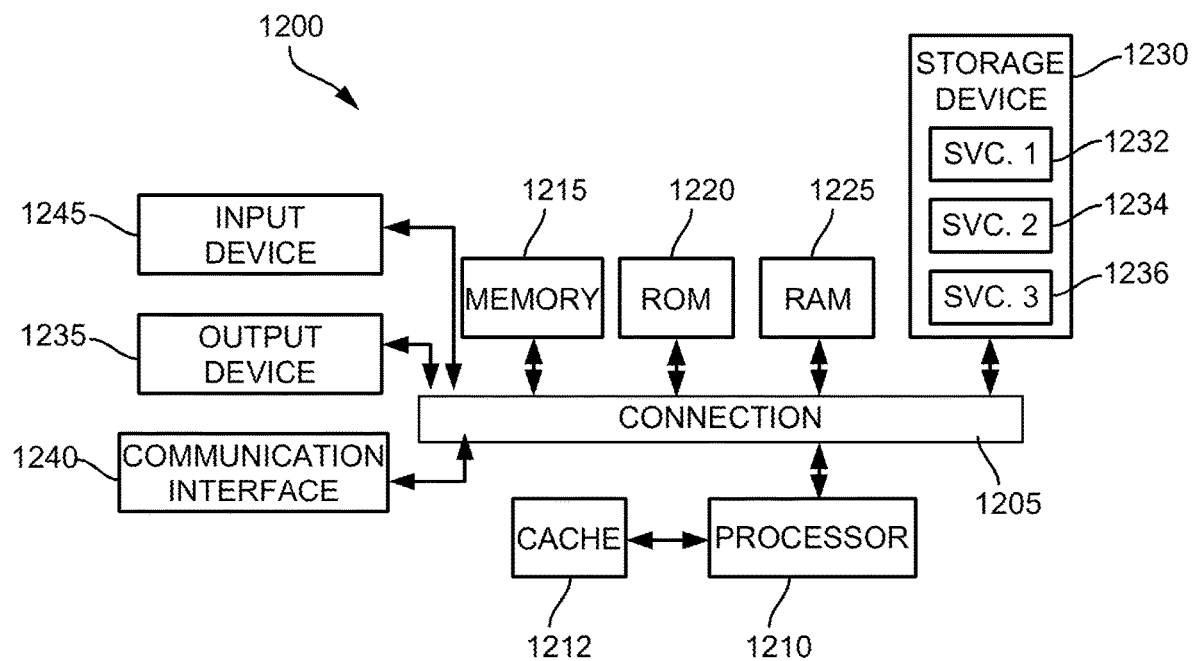
FIG. 12 illustrates an example computing device architecture, in accordance with some examples.

FIG. 12 illustrates an example computing device architecture 1200 of an example computing device which can implement the various techniques described herein. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service, such as service 1 1232, service 2 1234, and service 3 1236 stored in storage device 1230, configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device, etc. In some instances, multimodal computing devices can enable a user to provide multiple types of input to communicate with the computing device architecture 1200. The communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include services 1232, 1234, 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   detecting an alarm condition at a network device, the alarm condition comprising an anomaly or increase in a traffic condition in a network;
   identifying a first dominant key from a first set of keys associated with a first traffic flow and having a first key type and a second dominant key from a second set of keys associated with a second traffic flow and having a second key type, wherein the first set of keys associated with the first traffic flow comprises one or more of a first Internet Protocol (IP) address field, a first source IP address field, a first destination port number field, a first source port number, a first application identifier, a first interface, and a first protocol field and the second set of keys associated with the second traffic flow comprises one or more of a second IP address field, a second source IP address field, a second destination port number field, a second source port number field, a second application identifier, a second interface and a second protocol field, wherein the first dominant key and the second dominant key are different key types and both contributed to the alarm condition, and wherein the first dominant key and the second dominant key each have relative higher contributions to the alarm condition that at least one other dominant key having a relative lower contribution;
   excluding the at least one other dominant key having the relative lower contribution from an aggregation of dominant keys to determine a combination of dominant keys;
   aggregating the first dominant key and the second dominant key to determine the combination of dominant keys which contributed to the alarm condition; and
   identifying a dominant traffic flow comprising the combination of dominant keys which contributed to the alarm condition and traffic flows which have predominantly contributed to the alarm condition.

2. The method of claim 1, wherein the traffic condition comprises one or more of a jitter, latency, packet drop count, or retransmission.

3. The method of claim 1, wherein the first key type comprises one or more of a source IP address, destination IP address, port, protocol, application, interface, application identifier (ID), interface ID, Security Group Tag (SGT), Access Point (AP) ID, Wireless Local Area Network (LAN) Controller (WLC) ID, Client Media access control (MAC) address, or Virtual LAN (VLAN) ID.

4. The method of claim 1, wherein identifying the first dominant key and the second dominant key comprises grouping and clustering the traffic condition pertaining to the first key type or the second key type to determine outliers.

5. The method of claim 1, wherein aggregating the first dominant key and the second dominant key comprises ordering the first dominant key and the second dominant key into an ordered set based on their individual contributions to the alarm condition, and aggregating contributions from combinations of the first dominant key and the second dominant key to determine whether a combination of the first dominant key and the second dominant key have a contribution greater than a predetermined threshold to the alarm condition.

6. The method of claim 5, further comprising eliminating least contributing dominant keys from the ordered set in a stepwise manner until the combination of the first dominant key and the second dominant key having the contribution greater than the predetermined threshold to the alarm condition is obtained.

7. The method of claim 1, wherein one of the first dominant key and the second dominant key comprises a dominant source IP address which contributed to a predominant number of packet drops or retransmissions at ports of the network device, and wherein the method further comprises identifying the dominant source IP address to include an originator of malware for scanning the network.

8. The method of claim 7, wherein packet drops or retransmissions are collected at a collector from different routers of the network at which packets from the dominant source IP address were received and dropped.

9. A system, comprising:
one or more processors; and
a non-transitory computer-readable storage medium containing instructions which, when executed on the one or more processors, cause the one or more processors to perform operations including:
detecting an alarm condition at a network device, the alarm condition comprising an anomaly or increase in a traffic condition in a network;
identifying a first dominant key from a first set of keys associated with a first traffic flow and having a first key type and a second dominant key from a second set of keys associated with a second traffic flow and having a second key type, wherein the first set of keys associated with the first traffic flow comprises one or more of a first Internet Protocol (IP) address field, a first source IP address field, a first destination port number field, a first source port number, a first application identifier, a first interface, and a first protocol field and the second set of keys associated with the second traffic flow comprises one or more of a second IP address field, a second source IP address field, a second destination port number field, a second source port number field, a second application identifier, a second interface and a second protocol field, wherein the first dominant key and the second dominant key are different key types and both contributed to the alarm condition, and wherein the first dominant key and the second dominant key each have relative higher contributions to the alarm condition that at least one other dominant key having a relative lower contribution;
excluding the at least one other dominant key having the relative lower contribution from an aggregation of dominant keys to determine a combination of dominant keys;
aggregating the first dominant key and the second dominant key to determine the combination of dominant keys which contributed to the alarm condition; and
identifying a dominant traffic flow comprising the combination of dominant keys which contributed to the alarm condition, and traffic flows which have predominantly contributed to the alarm condition.

10. The system of claim 9, wherein the traffic condition comprises one or more of a jitter, latency, packet drop count, or retransmission.

11. The system of claim 9, wherein the first key type comprises one or more of a source IP address, destination IP address, port, protocol, application, interface, application identifier (ID), interface ID, Security Group Tag (SGT), Access Point (AP) ID, Wireless Local Area Network (LAN) Controller (WLC) ID, Client Media access control (MAC) address, or Virtual LAN (VLAN) ID.

12. The system of claim 9, wherein identifying the first dominant key and the second dominant key comprises grouping and clustering the traffic condition pertaining to the first key type or the second key type to determine outliers.

13. The system of claim 9, wherein aggregating the first dominant key and the second dominant key comprises ordering the first dominant key and the second dominant key into an ordered set based on their individual contributions to the alarm condition, and aggregating contributions from combinations of the first dominant key and the second dominant key to determine whether a combination of the first dominant key and the second dominant key have a contribution greater than a predetermined threshold to the alarm condition.

14. The system of claim 13, wherein the operations further comprise eliminating least contributing dominant keys from the ordered set in a stepwise manner until the combination of the first dominant key and the second dominant key having the contribution greater than the predetermined threshold to the alarm condition is obtained.

15. The system of claim 13, wherein one of the first dominant key and the second dominant key comprises a dominant source IP address which contributed to a predominant number of packet drops or retransmissions at ports of the network device, and wherein the operations performed by the one or more processors further comprise identifying the dominant source IP address to include an originator of malware for scanning the network.

16. The system of claim 15, wherein packet drops or retransmissions are collected at a collector from different routers of the network at which packets from the dominant source IP address were received and dropped.

17. A non-transitory machine-readable storage medium, including instructions configured to cause a data processing apparatus to perform operations comprising:
detecting an alarm condition at a network device, the alarm condition comprising an anomaly or increase in a traffic condition in a network;
identifying a first dominant key from a first set of keys associated with a first traffic flow and having a first key type and a second dominant key from a second set of keys associated with a second traffic flow and having a second key type, wherein the first set of keys associated with the first traffic flow comprises one or more of a first Internet Protocol (IP) address field, a first source IP address field, a first destination port number field, a first source port number, a first application identifier, a first interface, and a first protocol field and the second set of keys associated with the second traffic flow comprises one or more of a second IP address field, a second source IP address field, a second destination port number field, a second source port number field, a second application identifier, a second interface and a second protocol field, wherein the first dominant key and the second dominant key are different key types and both contributed to the alarm condition, and wherein the first dominant key and the second dominant key each have relative higher contributions to the alarm condition that at least one other dominant key having a relative lower contribution;
excluding the at least one other dominant key having the relative lower contribution from an aggregation of dominant keys to determine a combination of dominant keys;
aggregating the first dominant key and the second dominant key to determine the combination of dominant keys which contributed to the alarm condition; and
identifying a dominant traffic flow comprising the combination of dominant keys which contributed to the alarm condition and traffic flows which have predominantly contributed to the alarm condition.

18. The non-transitory machine-readable storage medium of claim 17, wherein the traffic condition comprises one or more of a jitter, latency, packet drop count, or retransmission.

19. The non-transitory machine-readable storage medium of claim 17, wherein the first key type comprises one or more of a source IP address, destination IP address, port, protocol, application, interface, application identifier (ID), interface ID, Security Group Tag (SGT), Access Point (AP) ID, Wireless Local Area Network (LAN) Controller (WLC) ID, Client Media access control (MAC) address, or Virtual LAN (VLAN) ID.

20. The non-transitory machine-readable storage medium of claim 17, wherein identifying the first dominant key and the second dominant key comprises grouping and clustering the traffic condition pertaining to the first key type or the second key type to determine outliers.

\* \* \* \* \*